3,298,994
STABILIZED POLY(OMEGA-AMINO CARBOXYLIC ACID) COMPOSITIONS CONTAINING COPPER AND A DICARBOXYLIC ACID DIAMIDE
Alex Krieger, Emmenbrucke, Lucerne, Switzerland, assignor to Societe de la Viscose Suisse, Emmenbrucke, near Lucerne, Switzerland, a Swiss body corporate
No Drawing. Filed Jan. 20, 1964, Ser. No. 338,589
Claims priority, application Great Britain, Jan. 24, 1963, 3,060/63
3 Claims. (Cl. 260—45.75)

This invention relates to heat-stabilised poly($\omega$-amino carboxylic acid) compositions and to shaped articles, filaments and yarns made therefrom.

It is known that synthetic polyamides suffer a deterioration of their mechanical properties under the influence of heat. When such polyamides are exposed for some time to higher temperatures, they usually become brittle and their tensile strength decreases considerably. Parallel to this degradation, the polyamides show a decrease of their viscosity indicating a reduction of their average molecular weight. Since shaped articles, especially fibres, made from polyamides are widely used because of their excellent mechanical properties, the heat-sensitivity of such articles and fibres is a great disadvantage and many efforts have been made to prepare synthetic polyamides which retain their strength after exposure to high temperatures.

A great variety of substances has been proposed as stabilisers for polyamides, among them phenolic compounds, phosphorous salts, halogen-containing acids and heavy metals. Manganese and copper salts, in particular, have been proposed as well as combinations of these two metals with each other or with other substances. Thus, British patent specification No. 652,947 describes copper salts together with diketones, United States patent specification No. 2,705,227 mentions a combination of copper, halogen-containing salts and phosphorous compounds, and United States patent specification No. 2,960,489 suggests copper salts with halogen-containing organic bases. Some of these combinations give good results, but there is still a demand for substances or combinations of substances which will give synthetic polyamides a still better protection.

It has now been found according to the present invention that copper and an organic dicarboxylic acid diamide together impart to poly($\omega$-amino carboxylic acids), especially polycaprolactams, a protection against degradation by heat which considerably surpasses the protection afforded by the use of copper salts alone or diamides alone. Naturally the diamide used should itself be stable to heat.

The present invention therefore comprises poly($\omega$-amino carboxylic acid) compositions which are stabilised against degration by heat by the incorporation with the poly($\omega$-amino carboxylic acid) during polymerisation of copper and a heat-stable diamide of a dicarboxylic acid.

The heat stabilisers are preferably introduced into the poly($\omega$-amino carboxylic acid) by adding them to the monomer before starting polymerisation or by adding them to an early stage of the polymerisation.

The copper is preferably used in the form of copper acetate, but any other suitable copper compound may be used. The dicarboxylic acid diamides employed must, of course, be stable at the temperatures at which polycaprolactam or other poly($\omega$-amino carboxylic acid) is made (where the diamide is introduced before the polymerisation is complete) and at the temperatures used in subsequent shaping steps. Oxalic acid diamide (oxamide), adipic acid diamide (adipamide) and terephthalic acid diamide (terephthalamide) give very good results. The preferred quantities of stabilisers used are between 0.005 and 0.02 percent of copper acetate, equal to between 15 and 60 parts of copper per million parts of polymer, and between 0.01 and 0.05 percent of oxamide, adipamide or terephthalamide, all in percent by weight of the weight of the polymer. Differently expressed, the amount of diamide may be such as to provide 500–2500 parts by weight of acid amide radical (—$CONH_2$) per million parts of polymer.

The heat stability of synthetic polyamide fibres and yarns is especially important for their use as tyre cords, as such cords are exposed to high temperatures during vulcanisation and also in the regular use of the tyres. It is, therefore, a great advantage that the use of a stabilising agent according to the present invention provides fibres, which after prolonged heating show at the most only a small loss of their strength. To give an example, the tensile strength of a yarn made from polycaprolactam and containing as stabilisers copper acetate and adipamide which was heated in air during 8 hours to 177° C., was only 1 percent lower than before heating, while yarns made for comparison and containing as stabiliser copper acetate only or adipamide only had lost 13 percent and 35 percent, respectively, of their original strength. Correspondingly, the viscosity of the yarns, which is a measure of the average molecular weight of the polyamide, decreased by only 4 percent in the case of yarns stabilised with copper and adipamide, as compared with 10 and 24 percent respectively, in the case of yarns containing copper only and adipamide only. It may also be noted that the effects of the stabilisers according to the present invention are not impaired by dyeing or the addition of optical brightening agents, and dyeing and optical brightening are not disturbed by the presence of the stabilisers.

As already indicated, the stabilisers are preferably incorporated into the polycaprolactam or other poly($\omega$-amino carboxylic acid) during polymerisation. For example caprolactam is melted at about 90° C. and the copper salt and dicarboxylic acid diamide are added together with about 1 percent of water and 0.1 percent of benzoic acid as chain stopper, all in percent by weight of the weight of caprolactam. The mixture is heated under nitrogen for 2 hours at 250° C. in an autoclave. Then the pressure is released and polymerisation continued in a nitrogen atmosphere for 4 hours at the same temperature.

The invention is illustrated by the following example, in which the incorporation of the stabiliser and the polymerisation schedule was as described above. In the table, the tensile strength, expressed in grams per denier, is measured as usual and the "reduced viscosity" $[\eta]_{0.2}$ is calculated according to the formula:

$$[\eta]_{0.2} = \frac{\ln \eta \text{ rel}}{0.2}$$

wherein the relative viscosity $\eta$ rel is determined in a solution containing 0.2 grams of polycaprolactam fibre in 100 ml. of 94% sulphuric acid at a temperature of 20° C.

*Example*

Six polycaprolactam compositions were prepared, each made from 5 kg. of caprolactam, composition (1) containing as stabiliser 1 g. (=0.02%) of oxamide, composition (2) containing 1.65 g. (=0.033%) of adipamide, composition (3) containing 0.5 g. (=0.01%) of copper acetate, equal to 31.5 parts of copper per million parts of polycaprolactam, composition (4) containing 0.5 g. of copper acetate and 1.0 g. of oxamide, composition (5) containing 0.5 g. of copper acetate and 1.65 g. of adipamide and composition (6) containing 0.5 g. of copper acetate and 1.86 g. of terephthalamide. From each composition yarns were melt-spun and drawn. Each yarn was composed of 23 filaments and had a titre of 8 tex.

The reduced viscosity and tensile strength of each of the six yarns were examined (a) before the yarns were exposed to heat and (b) after the yarns had been heated in air during 8 hours at 177° C. In each case several tests were made, and the averages of each case are tabulated below, showing the reduced viscosity and tensile strength of the unheated yarns and the changes of viscosity and strength of the heated yarns expressed in percent of the viscosity and strength of the unheated samples.

| Stabiliser used | (a) Yarns not exposed to heat | | (b) Yarns heated 8 hrs. at 177° C. | |
|---|---|---|---|---|
| | Reduced viscosity, ln η rel/0.2 | Tensile strength, g./denier | Change of reduced viscosity | Change of tensile strength |
| | | | Against yarns not exposed to heat | |
| (1) Oxamide | 1.136 | 6.4 | −60% | −67% |
| (2) Adipamide | 0.845 | 4.4 | −24% | −35% |
| (3) Cu | 1.222 | 5.5 | −10% | −13% |
| (4) Cu plus oxamide | 1.260 | 5.8 | +4% | +1% |
| (5) Cu plus adipamide | 1.121 | 5.8 | −4% | −1% |
| (6) Cu plus terephthalamide | 1.005 | 5.6 | −7% | −3% |

The invention has been described above particularly with reference to polycaprolactams for which it is most valuable. It may, however, be applied to other synthetic poly(ω-amino carboxylic acids), for example poly-11-amino-undecanoic acid.

I claim:

1. A poly(omega-amino carboxylic acid) composition stabilized against degradation by heat by having incorporated therein copper acetate in an amount between about 15 to 60 parts by weight per million parts by weight of poly(omega-amino carboxylic acid) and a heat-stable diamide of a dicarboxylic acid selected from the group consisting of oxamide, adipamide and terephthalamide, said diamide being present in an amount such that the amount by weight of the acid amide radical (—$CONH_2$) is between about 500 to 2500 parts per million parts of poly (omega-amino carboxylic acid).

2. A composition according to claim 1 in the form of a shaped article.

3. A composition according to claim 1 in the form of a filament.

References Cited by the Examiner

UNITED STATES PATENTS 3,211,562  10/1965  Biland et al. _____ 260—45.9

FOREIGN PATENTS 906,893  6/1945  France.

LEON J. BERCOVITZ, *Primary Examiner.*

G. W. RAUCHFUSS, Jr., *Assistant Examiner.*